(12) United States Patent
Boss et al.

(10) Patent No.: US 10,353,555 B2
(45) Date of Patent: Jul. 16, 2019

(54) GLOBAL ONLINE DIGITAL ASSET MANAGEMENT (DAM)

(71) Applicant: FOX DIGITAL ENTERPRISES, INC., Los Angeles, CA (US)

(72) Inventors: Garrett V. Boss, Hermosa Beach, CA (US); Jonathan A. de Armas, Long Beach, CA (US); Dmitry Erman, Simi Valley, CA (US); Grace C. Jeng, Los Angeles, CA (US); Ashley M. Mason, Los Angeles, CA (US); Jane R. Prior, Truckee, CA (US)

(73) Assignee: FOX DIGITAL ENTERPRISES, INC., Los Angeles, CA (US)

( * ) Notice: Subject to any disclaimer, the term of this patent is extended or adjusted under 35 U.S.C. 154(b) by 249 days.

(21) Appl. No.: 15/177,162

(22) Filed: Jun. 8, 2016

(65) Prior Publication Data

US 2016/0366196 A1 Dec. 15, 2016

Related U.S. Application Data

(60) Provisional application No. 62/174,328, filed on Jun. 11, 2015.

(51) Int. Cl.
| | | |
|---|---|---|
| G06F 3/048 | (2013.01) |
| G06F 3/0484 | (2013.01) |
| H04L 29/08 | (2006.01) |
| H04L 12/58 | (2006.01) |
| G06F 16/44 | (2019.01) |
| G06Q 10/10 | (2012.01) |

(52) U.S. Cl.
CPC ............ *G06F 3/0484* (2013.01); *G06F 16/44* (2019.01); *G06Q 10/101* (2013.01); *H04L 51/16* (2013.01); *H04L 67/26* (2013.01); *H04L 67/34* (2013.01)

(58) Field of Classification Search
CPC .............................. G06F 3/048; G06Q 10/101
See application file for complete search history.

(56) References Cited

U.S. PATENT DOCUMENTS

| | | | | |
|---|---|---|---|---|
| 2007/0183741 A1* | 8/2007 | Lerman | ............. | G06F 17/30017 386/249 |
| 2008/0168117 A1* | 7/2008 | Coates | ............. | G06F 17/30867 709/201 |
| 2013/0031208 A1* | 1/2013 | Linton | ..................... | G09B 7/02 709/217 |

(Continued)

*Primary Examiner* — Xuyang Xia
(74) *Attorney, Agent, or Firm* — Gates & Cooper LLP

(57) ABSTRACT

A method, system, apparatus, article of manufacture, and computer program product provide the ability to manage a digital asset. One or more media content assets are acquired. Metadata describing the assets is also acquired. The metadata enables a search of the assets within a content repository. The assets and metadata are stored in the content repository. An online collaboration tool is provided. Such a tool: provides a discussion thread regarding the assets; manages, controls, and provides preview, download, and upload capability, of the assets, to a defined set of users; provides search capability of the content repository for the assets based on the metadata; provides opt-in capability to allow the users to opt-in to receive notifications regarding the assets; and provides a multi-contributional workspace where the users with authorization may preview, download, and upload the assets.

18 Claims, 8 Drawing Sheets

(56) References Cited

U.S. PATENT DOCUMENTS

| | | | |
|---|---|---|---|
| 2014/0281848 A1* | 9/2014 | Mahafzah | G06F 16/4393 715/202 |
| 2015/0193383 A1* | 7/2015 | Rao | G06F 17/212 715/243 |

* cited by examiner

GLOBAL ONLINE DIGITAL ASSET MANAGEMENT (DAM)

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

Provisional Application Ser. No. 62/174,328, filed on Jun. 11, 2015, with inventor(s) Garrett V. Boss, Jonathan A. de Armas, Dmitri Erman, Grace C. Jeng, Ashley M. Mason, and Jane R. Prior, entitled "Global Online Digital Asset Management (DAM).

This application is related to the following and commonly-assigned patent application, which application is incorporated by reference herein:

U.S. Patent Application Ser. No. 62/013,470, entitled "Online Global Planning System for International Theater Post Production and Enterprise Operations", by Garrett Vincent-McKay Boss, Giles A. Pretty, Jennie P. Ho, Nikolaus Kelly Ward, and Niravkumar G. Majmudar, filed on Jun. 17, 2014; and U.S. Patent Application Ser. No. 62/030,503, entitled "Digital Asset Dock (DAD)", by John J. Angelini II, Elsa Fiorella Gardella, Juliano Zucchetto Teixeira, David R. Trujillo, Gitte Dahl, Marc Henri Paul, Peter D. Bakalov, Winston Cheun Wan, Patrick H. Tran, and Mangesh Pimpalkar, filed on Jul. 29, 2014.

BACKGROUND OF THE INVENTION

1. Field of the Invention

The present invention relates generally to managing media content, and in particular, to a method, system, apparatus, and article of manufacture for managing sports and entertainment content in a collaborative environment.

2. Description of the Related Art

Digital media content assets (aka an asset and/or media content) have become more and more ubiquitous as the television and film industry has transitioned from physical film media to digital management, storage, and transmission (e.g., across the Internet and/or other internal networks). Within the television industry, users throughout the world create content (e.g., advertising such as print, audio, video, an advertising campaign, etc.), often times without access to similar content created by other users. Prior art systems fail to provide the ability for such content creators to collaborate, to view what other content creators have created, and for a content owner/brand to manage maintain consistency for content across a brand.

SUMMARY OF THE INVENTION

Embodiments of the invention overcome the problems of the prior art and provide a unique application that is specific to sports marketing, that is accessible to sports marketing personnel all over the world, and provides an opportunity to such personnel, in real-time, to interface and collaborate with each other, while also enabling access to a content repository (containing marketing and other digital media content assets) such that users can preview, upload, and download inspirational and other assets for further editing, reusing, repurposing, etc. Such an online collaboration tool enables a content owner to influence/manage/maintain an entire brand strategy, and further overlay such a brand strategy onto a specific sporting event/experience to provide a consistent brand strategy over time and over location/multiple locations.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

System Level Overview

An Enterprise Media Framework (EMF) provides a system for managing a large volume of media content (e.g., for a studio or other media provider). In particular, the EMF may provide one or more of the following capabilities/features with respect to media content:

- a centralized Digital Asset Management (DAM) and repository (in a system referred to as "ESPRIT");
- Search;
- Preview;
- Download;
- Ingest;
- Accelerated File Transfer;
- Digital Screeners (films/tv);
- Broadcast Quality File Delivery (self-service and push);
- Annotation/Markup (time-based and non-time based);
- Watermark, Digital Rights Management (DRM), etc.

As used herein, the terms media content, media content asset, asset, and content refer to any type of digital media content used for television, film, marketing, etc. In this regard, media content may include audio, text, still photographs, videos, etc. Many types and pieces of information or media content may be utilized as part of the broadcast, advertisement, and sale of such content. Content from various studios (e.g., FOX™) may include:

- Over 2,500 Feature Films; over 14,000 Television Series, Seasons and Episodes; and over 1,000 Specials, Movies of the Week and MiniSeries;
- Over 100,000 images: Production Stills, Logos, Artwork, Gallery and Episodic Photos;
- Over 12,000 Scripts and over 10,000 Music Cue Sheets;
- Over 7,300 trailers and other promotional videos;
- Over 2,500 episodes for screening;
- Over 9,300 broadcast quality files, representing over 700 episodes; and
- Over 1,000 broadcast quality promotional videos (Television spots, etc.).

Exemplary formats in which an asset may be created/stored include MPEG2 (motion pictures expert group version 2), MPEG4, NTSC (national television system committee) 4×3 aspect ratio, 30 fps (frames per second), PAL (phase alternating line) 16×9 aspect ratio at 25 fps, etc. Content may also include television broadcast quality assets, J2K (JPEG 2000) files, etc. Additional assets may include DCP (Digital Cinema Projection) files (i.e., theatrical feature or trailer playouts), DCDM (Digital Cinema Distribution master) files (i.e., post production assets prior to DCP—useful for archiving and may be used for international re-versioning purposes), DSM (Digital Source Master) files (i.e., the original film supplied to an encoding facility), MXF (material eXchange Format), etc. In this regard, media content assets refer to any type of digital representation of media content and/or marketing content for such an asset.

Figure 1:
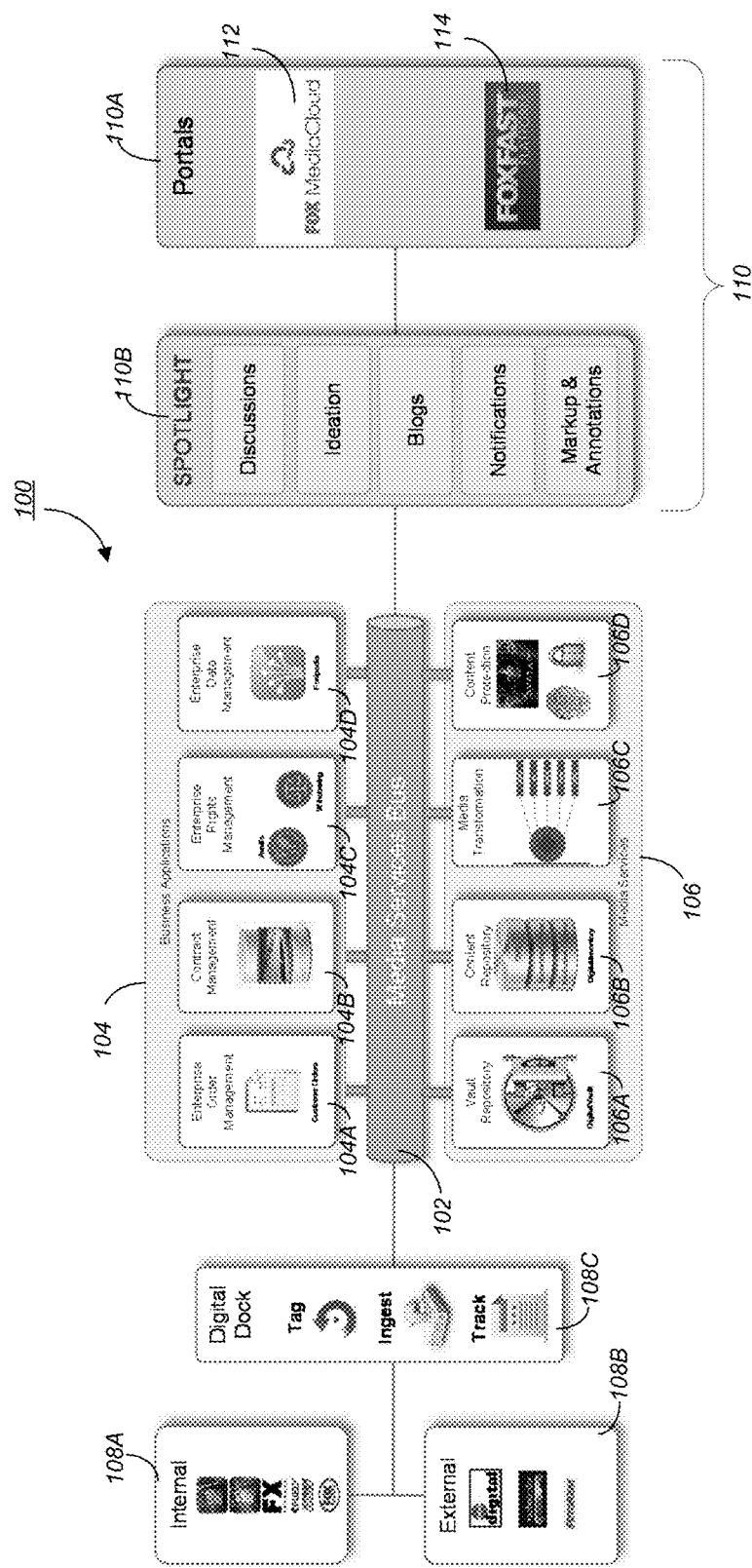
FIG. 1 illustrates a system level overview of an enterprise management framework (EMF) system in accordance with one or more embodiments of the invention.

FIG. 1 illustrates a system level overview of an EMF system 100 in accordance with one or more embodiments of the invention. The media services bus 102 (e.g., an ORACLE™ enterprise service bus) provides the communication mechanism within which the remaining components of the EMF 100 collaborate and integrate with each other. The business applications 104 provide applications used in business and supply chains to provide and distribute the media content. Media services 106 provide the services for storing media content, transforming media content, protecting media content, etc. The components 108 on left side of FIG. 1 provide for the ingestion processes including internal ingestion systems 108A, external ingestion systems 108B, and the Digital Asset Dock (DAD) ingestion system 108C (referred to collectively as ingestion processes/components 108). The components 110 on the right side of FIG. 1 provide for the delivery processes including content delivery and portals.

The media services 106 include the vault repository 106A (also referred to as the digital vault) that maintains the pristine masters of the media content and may consist of a separate digital asset management system that is maintained by an internal secure group (e.g., FOX MEDIA SERVICES™). The content repository 106B (also referred to as the digital inventory or ESPRIT™ system) maintains renditions made from the vault 106A masters. Media transformation services 106C provides transcoding capabilities such that as content comes into the content repository 106B, a different rendition of that media asset may be created by media transformation services 106C (e.g., a low res [resolution] proxy for screening purposes, etc.). Content protection component 106D provides the ability to add an overlay or digital rights management (DRM) wrapping for a particular file/asset.

The enterprise order management business application 104A is designed to take orders from customers and a contract management system and determine if a deliverable exists that meets the order. If no deliverable exists, a purchase order (PO) for that item is created and sent to a vendor or internal post house to ingest the content into the repository and ultimately deliver the content to the customer when needed (e.g., via a push process or a pull process such as via a download from web interface based system (e.g., FOXFAST™).

The contract management component 104B defines/configures/sets up a contract, and information for the contract is converted into specific deliverables that need to be delivered to a customer (e.g., the contract is used to define/set up a purchase order for a deliverable). Once defined, the content repository 106B (that contains a digital inventory of the various deliverables/assets) may be searched for the content. If the content repository 106B does not contain the asset, additional systems may be searched to determine if the various parts of the asset are available.

The enterprise rights management (ERM) component 104C (also referred to as distribution rights management) captures/determines television distribution rights. In this regard, the ERM component 104C takes the legal contracts, and translates them into clearance memos that may be understood by other personnel (e.g., a lay-person). As an example, the ERM component 104C would determine, for a specific title, where the title is allowed to be distributed, where (e.g., in which territory) does a particular entity have rights to distribute such a title, and the media, language, terms, and any other restrictions that may apply to such a title. In this regard, the ERM component 104C interacts with the contract management component 104B such that when a contract is entered into, the ERM component 104C may determine whether the contract is in compliance with the distribution rights set forth in the ERM component 104C. Thus, the ERM component 104C governs the intellectual property rights regarding what an entity is allowed to distribute from a film/television show perspective. In contrast, the contract management component 104B specifies what has been licensed to a customer for the customer to exhibit within the customer's medium.

The ingestion components 108 provide the ability to ingest content into the EMF 100. The primary component is that of the digital asset dock (DAD) 108C which tags incoming content with the correct metadata so that the asset can be found and tracked easily.

The portals 110A, plug into the service bus 102 and call the needed service. In this regard, the service bus 102 may comprise infrastructure software where various services are registered on the bus 102 such that services can be reused across applications and do not need to be rebuilt. The portals 110A deliver content (marketing and ad/pub materials, broadcast quality files, and digital screeners), metadata (e.g., title-descriptive material), and available and license start/end date information. An exemplary portal 110A is referred to as FOXMEDIACLOUD™ 112 which may provide access to digital assets/content, digital screeners, and a view into a content owner's (e.g., FOX™) title information. In this regard, the FOX MEDIA CLOUD™ 112 may provide product information, usage restrictions and assets, a digital asset dock (streamlined ingestion) and a portal that leverages data and assets from the EMF 100, a metadata system, and other modules. Accordingly, the FOX MEDIA CLOUD™ 112 is a module that business partners and internal personnel can utilize for different business units (within a content owner entity) that provides content, title metadata, and screener access. In view of the above, portals 110A may provide the ability to easily assemble, effortlessly organize, and instantly share content and information in a reliable manner.

Another portal 110A that may be used is FOXFAST™ 114 which is an electronic distribution system for delivering content to one or more customers.

An exemplary metadata system that may be utilized in the systems described herein is FOXIPEDIA™. FOXIPEDIA™ provides global title descriptive and metadata for titles and versions including enterprise rights and ancillary assets.

In view of the above, the portals 110A provide a portal to the EMF 100. Such portals are often easy-to-use and intuitive, accessible anywhere and anytime via most modern browsers, and works just as smoothly on mobile tablets as on PCs and MACs. Security in the EMF 100 is protected (e.g., via content protection 106D) via SSL encryption (all file transfers are encrypted), adaptive authentication to ensure only the right people gain access to the system, and the ability to monitor and report on suspicious activity.

Delivery of content (via delivery mechanisms 110A) enables the sharing and consolidation of assets around the world in a secure alternative to FTP (file transfer protocol), where users can rapidly upload and download assets through accelerated file transfers, and the ability to share assets through email links. Administration of the system may be performed using robust security profiles and groups, the logging of activity, and usage reporting. A meaningful user interface provides a meaningful display of metadata fields and values along with a personalized search and upload metadata preferences capability. In addition, "collections" provide: a collaborative space for people to work together; a curated group of assets (manually and via metadata); organized content; and the ability to leverage inspirational (e.g., spotlight 110B) features. In this regard, the spotlight 110B may provide a collection/collaboration area for discussions, idea creation, blogs, notifications, markup and annotations of content. Further, an additional feature of one or more embodiments of the invention includes the ability to organize and view the contents in a collection. In this regard, the content in a collection may be viewed as a historical narrative/story or can be instructive regarding recommended uses of the content. Further, users may provide commentary that will help understand the data in a collection (e.g., similar to the services/information a librarian provides).

Global Sports/Television Digital Asset Management (DAM) System

There is a unique need in sports (and possibly television entertainment) to create, distribute, and share assets while maintaining a consistent brand in a cost efficient manner. As an example, within a content provider/owner such as FOX™, multiple business units/subsidiaries (e.g., FOX SPORTS™, SKY SPORTS™, STAR INDIA SPORTS™/STAR SPORTS™, FOX INTERNATIONAL CHANNELS™, etc.) may all independently develop and create marketing assets for sports. However, prior art systems fail to provide the ability to share creative assets (amongst the different entities) efficiently while optimizing the global talent base to elevate all sports brands consistently and cost-effectively.

Embodiments of the invention satisfy the above-identified need by enabling, via a back end ingestion system 108 (e.g., DAD 108C), a portal 110A (e.g., the FOX MEDIA CLOUD™ 112 or other module), and a digital vault/content repository 106B, a digital asset management (DAM) system that is specific to sports and/or television content. In this regard, several different tools are combined together to create the DAM (also referred to as the FOX MEDIA CLOUD™) that enables the streamline of content/asset distribution while integrating a library of content in an efficient and cost-efficient manner.

Such a system provides many benefits for creative directors, marketers, and their teams including: saving time and money; reducing duplication of work; expediting time to market; elevating brand, creative excellence, and skill sets; sharing great ideas and expertise, reducing the risk of using obsolete assets; bypassing the risk of conducting business via email; finding potential partnerships easily, and providing a secure system. In an exemplary use case, in the prior art, numerous graphics are kept on local servers, invisible to the wider groups. In embodiments of the invention, departments/regions upload the graphics (e.g., soccer balls) to a digital vault, thereby providing a ready-made supply of reusable assets.

Figure 2:
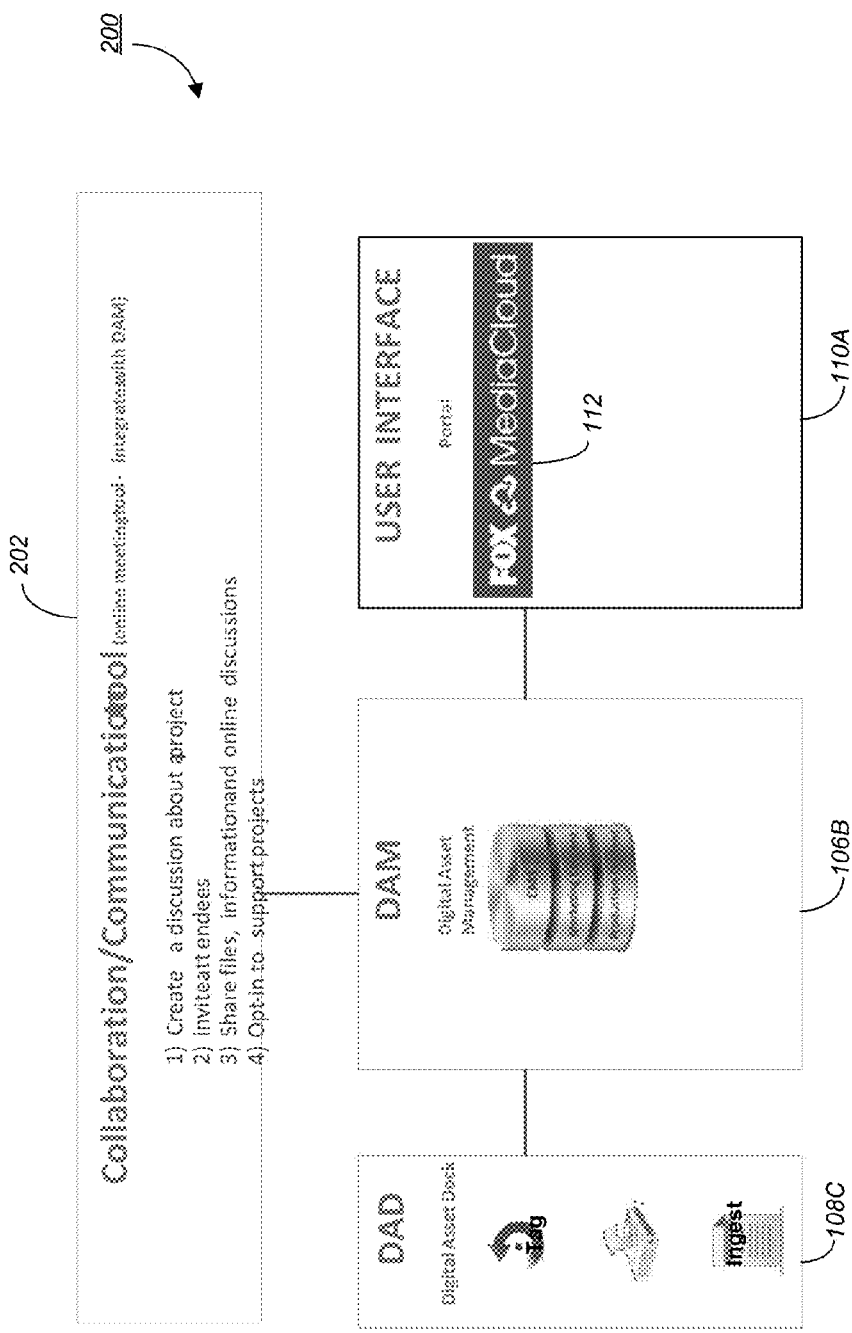
FIG. 2 illustrates a system level overview of a digital asset management (DAM) system in accordance with one or more embodiments of the invention.

FIG. 2 illustrates a system level overview of a DAM system 200 in accordance with one or more embodiments of the invention. As described above, the DAD 108C provides the ability to perform the bulk upload of assets with preset metadata. Alternatively, data can be uploaded via the FOX MEDIA CLOUD™ 112. The DAM 106B provides the central repository for storing assets. The user interface 110A provides a user portal (e.g., via FOX MEDIA CLOUD™ 112) where a client can search, upload, preview, and download files. Clients can also use user interface 110A to curate files into collections in a workspace. The collaboration/communication tool 202 provides an online meeting tool that is integrated with/into DAM 106B where users can create a discussion about a project, invite attendees, share files, information, and online discussions, and opt-in to support projects.

The system 200 can be used for a variety of purposes including for distribution, to maintain a library of elements, and as a showcase. An exemplary use case for distribution is the uploading of sports promos to DAM 106B, after which 200+ affiliates may be notified via an email link that can be clicked on/selected to preview and download the promo on demand. Another exemplary use case is a library of assets/elements (i.e., stored within DAM 106B). Such a library provides the ability to upload sports creative assets by region, thereby contributing/recontributing to the library of reusable assets (e.g., soccer ball graphics). Another exemplary use case is that of providing a showcase where a creative director can globally publish a promo/asset/etc. to inspire others and/or to demonstrate worthiness in branding and/or execution.

To enable system 200, two tools may be integrated together: a digital asset library (also referred to as DAM 106B) and an online collaboration tool 202. The digital asset library enables the ability to share, reuse, and distribute digital content/assets. As used herein, an asset is a digital file that may define logos, graphics, animations, packages, clips, promos, sets, music, rotoscoping, source and finished files, set design, etc. Through the DAM 106B, users may search, download, and upload such assets. The online collaboration tool 202: enables the ability to share plans, strategies, concepts, and partnerships; allows special interest groups to collaborate and communicate with each other; and provides the ability for vendors to register and participate in a collaborative environment.

Digital Asset Library

The Digital Asset Library may be referred to as the "Sport Asset Library" in accordance with embodiments of the invention. The digital asset library is enabled via the content repository 106B and a portal 110A (e.g., FOX MEDIA CLOUD™ 112). The portal 110A provides a portal/access point into a sport asset library that is maintained in the content repository 106B. However, embodiments of the invention may include the customization of the content repository 106B to meet the scale/complexity of sports related assets (e.g., the ability to hold/manage heavy, complex, numerous and associated files, and not to merely serve as an archive).

Features of the asset library 106B (and or user interface 110A into the library 106B) includes multi-contributional access (e.g., supports the contribution from various designers/creators), a table of contents (that emulates folder/subfolder structures), file packaging (groups within groups) and file introspection, a global program title database, ability to push and/or pull files/assets, and a graphical user interface with various tabs/menu options (e.g., help, glossary, vendor register, etc.). Other features/considerations for the digital asset library 106B include support for sports specific metadata and security policies, rights restrictions (notifications and warnings), the ability to choose the type of file to download (e.g., original or high resolution), expiry dates on assets, thumbnails for all files, and site links to assets stored in a central library. In addition, the asset library 106B may support versioning and check-in/check-out, the transcoding of files upon download, and the integration with other tools.

As an exemplary use of the digital asset library 106B, one may imagine that around the world, graphic designers/creators produce an asset that is reusable (e.g., a soccer ball, 2D/3D animations, etc.). Asset designers/creators can upload the asset and globally publish them into the digital asset library. Other entities may have the ability to search this library and use the asset/element/artwork in their own project/content materials/assets. Accordingly, existing assets may be recycled, reused, and repurposed. The metadata for such sports assets is unique in order to enable the ability to quickly and efficiently search the content. Such metadata may support music, audio, graphics, video, etc. as well as provide digital rights management (DRM) information that is enforced in/by the system. Table A below illustrates a high level metadata schema that may be used in accordance with one or more embodiments of the invention.

TABLE A

|  | Required? |
| --- | --- |
| Sport/Program | |
| Program ID | * |
| Program Name | * |
| Program Information | |
| Program ID | * |
| Event Date | * |
| Participating Teams | |
| Participants | |
| Sport | |
| Asset Information | |
| Asset ID | * |
| Division | * |
| Department | * |
| Asset Type | * |
| Program ID | |
| Sub Asset Type | |
| Length | |
| Version | |
| Revision | |
| Type | |
| Tag | |
| Spot Code (FS1) | |

TABLE A-continued

|  | Required? |
| --- | --- |
| Promo ID Number (Fox) | |
| Kill Date | |
| Year | |
| Description | |
| Usage Restrictions | |
| Asset | |
| Asset ID | * |
| Filename | * |
| Import Date | |
| Filesize | |
| Imported By | |
| File Format | |
| Video Details | |
| Asset ID | * |
| Resolution | |
| Codec | |
| Image Aspect Ratio | |
| Canvas Aspect Ratio | |

CREATIVE REVIEW™ Collaboration Tool

The CREATIVE REVIEW™ collaboration tool 202 consists of an online meeting tool with discussion threads attached to assets. The tool 202 provides many features including the ability to showcase/highlight/share an asset (e.g., an in inspirational or other asset the user is proud of). The tool 202 may be implemented using a plugin to OpenText Media Management called CREATIVE REVIEW™. However, implementations are not limited to any particular software or module. Further, embodiments of the invention may customize/modify such plugins/modules and enable user-group specific templates, customizable dashboards, opt-ins to receive assets or take part in upcoming productions, the ability to track and be notified directly when assets are available (if the user is participating in an opt-in), and enabling site links to assets stored in the digital library 106B.

The collaboration tool 202 enables a creator/designer to showcase a great piece of work that may be intended for use as an inspiration or as a basis for others. In this regard, when a user uploads an asset (e.g., a promotional print advertisement, campaign, etc.), the user may designate/flag the asset thereby identifying that the asset should not expire (other assets may only be available and/or may automatically expire/be removed after a defined or default time period) and is available for inspirational use. Such a designation may also include an identification/write-up (e.g., a paragraph, tag, metadata, etc.) that provides a rational that is associated with the asset (e.g., why the asset was created, the intended use of the asset, the intended audience, etc.). Thereafter, the asset is placed into an area that can be accessed globally within the enterprise management framework 100.

The collaboration tool 200 may also include a collaborative workroom/area where users can upload, view, and collaborate together with respect to one or more assets. Such a workroom may enable the ability to chat, invite and manage user groups, upload/download files, concepts, marketing plans, etc., communicate with other users, and find/build partnerships (e.g., with other users).

Figure 3:
FIG. 3 illustrates an exemplary graphical user interface for a collaboration tool being utilized to communicate plans/concepts in accordance with one or more embodiments of the invention.

FIG. 3 illustrates an exemplary graphical user interface for the collaboration tool 202 being utilized to communicate plans/concepts in accordance with one or more embodiments of the invention. In the scenario presented in FIG. 3, a client (i.e., Joel Koegh from BSKYB™) shares a concept/print ad 300 (i.e., the project "on the go print ad") with a global marketing group. A message (not shown) accompanying the uploaded print ad may provide "We're about to shoot! If you want assets, opt-in to receive key art." Further metadata/information associated with the print ad may indicate that assets may be offered for free (or offered at cost). Further, if other users elect to opt-in, such opt-ins may be tracked and final assets may be pushed to recipients from the DAM 106B. In this regard, the owner (i.e., Joel Keogh) may select the Report button 302 to receive a report on the users that have opted-in to the print ad. Further, the list of those clients/users that have elected to opt-in may be displayed in area 304. Accordingly, instead of merely providing assets and expertise upon request, embodiments of the invention may utilize the collaboration tool 202 to offer up the ad 300 to all relevant groups.

Figure 4:
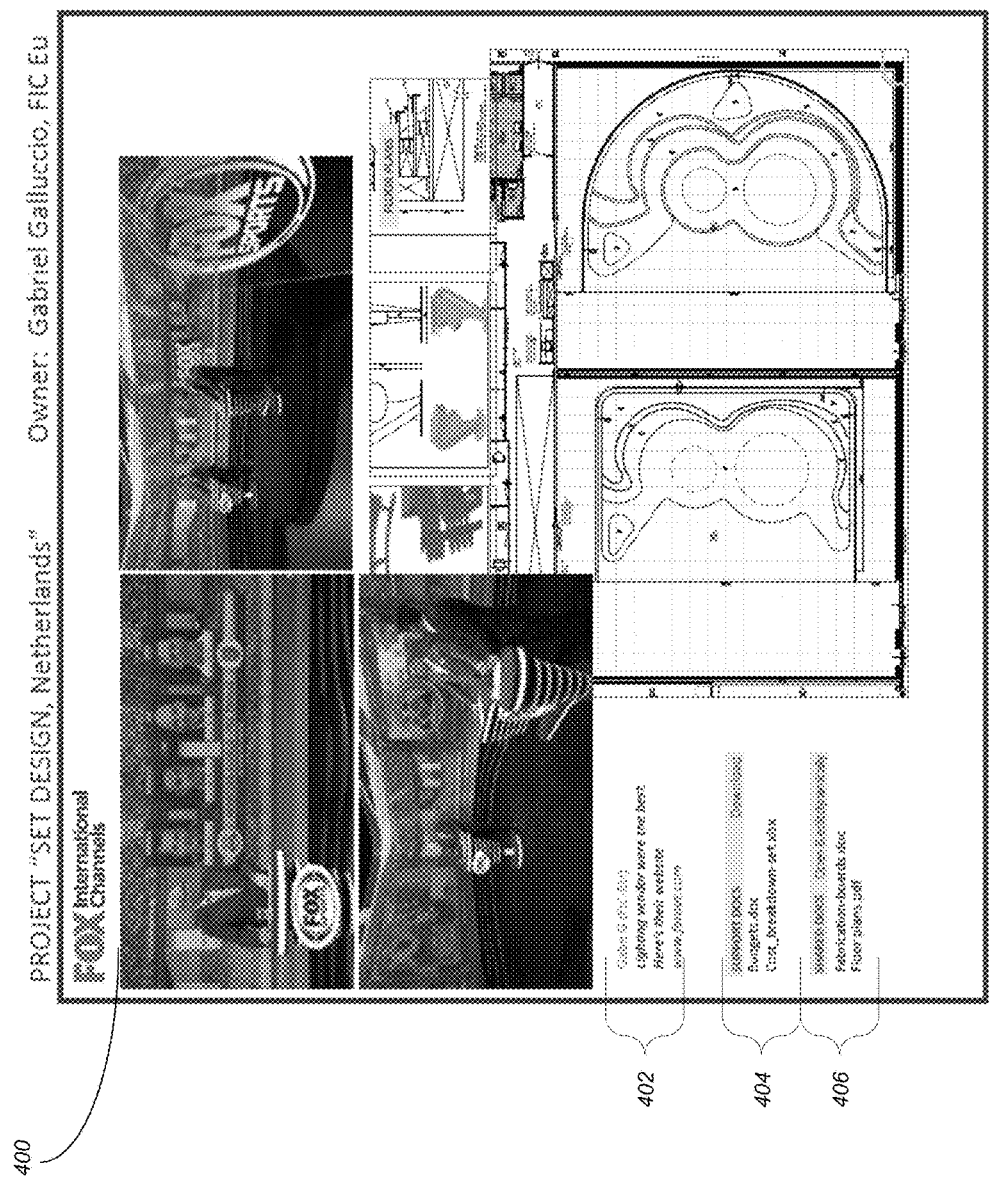
FIG. 4 illustrates an exemplary graphical user interface for a collaboration tool being utilized to share set designs in accordance with one or more embodiments of the invention.

FIG. 4 illustrates an exemplary graphical user interface for the collaboration tool 202 being utilized to share set designs in accordance with one or more embodiments of the invention. In FIG. 4, the owner, Gabriel Balluccio, has uploaded the project "Set Design, Netherlands" 400 to the DAM 106B. A note (not shown) may be associated with the uploaded project (e.g., "Check out our new set. We used front projection and virtuoso lighting. Very cost effective. Here's the lighting company's URL and support docs.") The set design may include images of the set, blueprints, notes 402, supporting documents 404, and shared documents 406. Note 402 may include a comment (e.g., "Lighting vendor were the best. Here's their website"), the owner/author of the note/comment (e.g., Gabe C) and an active hyperlink to a URL (of the vendor's website) if desired. Supporting docs 404 may include a link to allow the user to directly download desired documents (e.g., budgets and/or cost breakdowns). Further, as illustrated, shared documents 406 may include a link for the user to open and dynamically edit particular documents (e.g., fabrication boards and/or floor plans). In other words, the various notes, documents, and links allow users to collaborate with each other and view/ edit documents as desired. Other scenarios may include sharing promos (for distribution or for showcasing/inspiration), user forums to meet online and review work and problems, etc. Some embodiments may include project management capabilities (e.g., a review and approval process) while other embodiments specifically exclude such project management tools/capabilities.

Figure 5:
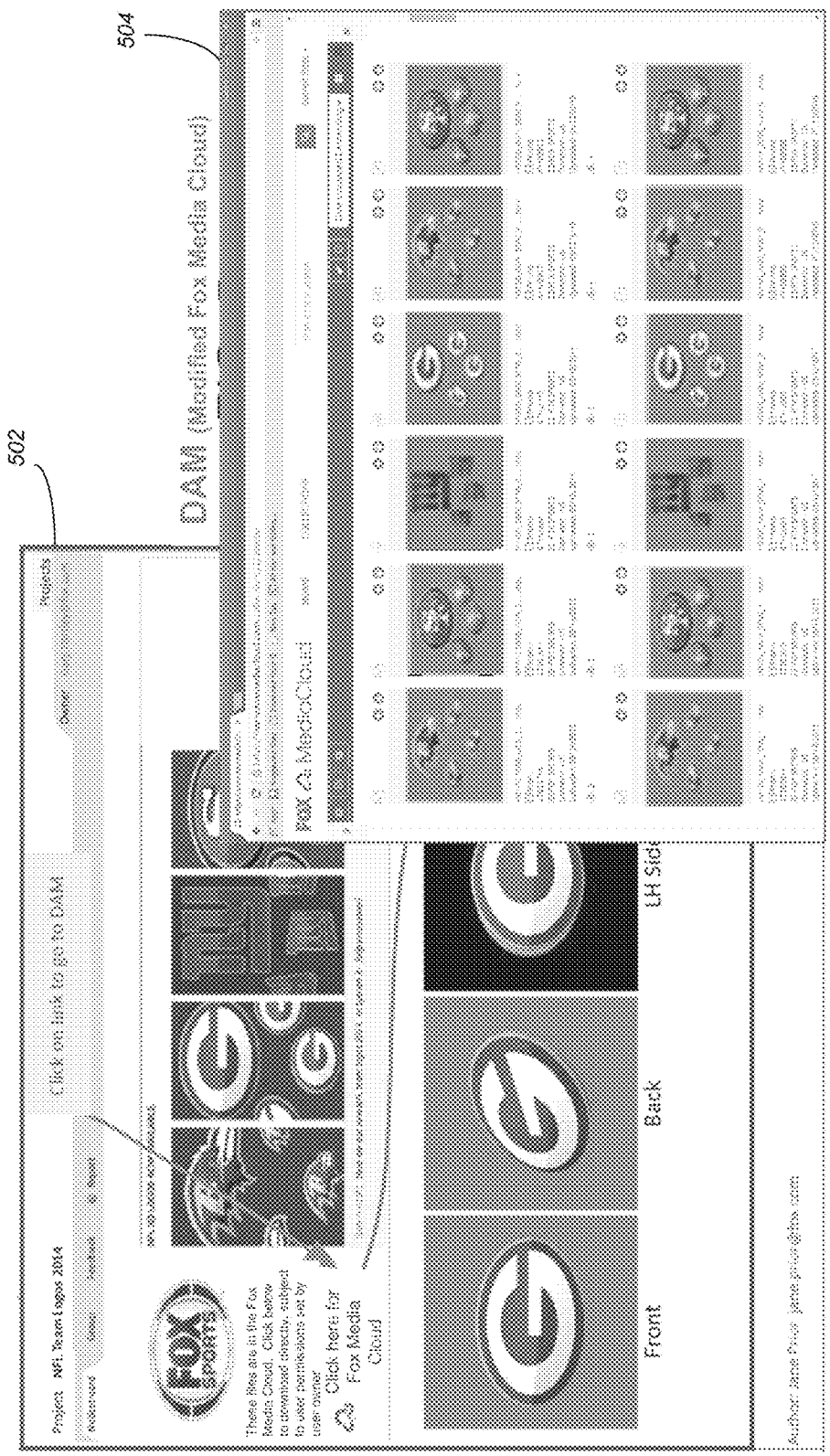
FIG. 5 illustrates an exemplary graphical user interface that shows the integration/collaboration between a collaboration tool and a digital asset management (DAM) asset library in accordance with one or more embodiments of the invention

FIG. 5 illustrates an exemplary graphical user interface that shows the integration/collaboration between a collaboration tool 202 and a digital asset management (DAM) asset library in accordance with one or more embodiments of the invention. A creative director may upload NFL™ logos to the DAM 106B and create an NFL Team Logos 2014 project collaboration area 502 accompanied by the announcement "NFL Logos now available". Such a project collaboration area 502 may include the ability to view different logos available in DAM 106B. For example, collaborators may view different versions of a team's logo (e.g., for Green Bay, a front, back, left hand side and right hand side logo may be uploaded to DAM 106B). The creative director may also configure the ability for other users to select a link to a portal (e.g., the FOX MEDIA CLOUD™ 112). Such a link (upon selection) may take the user directly to a portal interface 504 (i.e., an interface to the DAM 106B—i.e., the file repository for the stored logos) where the user may download files/file sets directly from DAM 106B (e.g., subject to user permissions set by the asset owner).

Distribution of content/assets via the DAM system 200 is flexible. For example, content/assets may be pushed out to one or more users/regions, downloaded by one or more users/regions, visible but not downloadable, etc. In an exemplary use case, a big ticket property (e.g., the SUPER-BOWL™) in one market (e.g., the United States) may be a low rater in another market (e.g., Philippines). In such a scenario, a graphics package may be pushed to local regions. At any time, the owner can push or notify global colleagues of the graphics package (subject to the usual permissions and rights). The package may be visible to all, but only downloadable if permission is granted. Alternatively, the package may be made visible only to the owner or the owner's group. Further, assets in the DAM 106B, may be offered at cost (up to owner). If an asset has a cost attached, such a cost may be noted in the metadata associated with the asset.

In view of the above, the portal interface 504 provides a portal to the sports asset library in the FOX MEDIA CLOUD™. To enable such a sports asset specific library, the content repository 106B may be modified/expanded for scale/complexity. Further, the content repository 106B is configured to hold/manage/distribute heavy, complex, numerous and associated files, along with the ability to perform the bulk upload/download and edit of metadata. The content repository 106B (in combination with a portal 110A) enables the ability to run usage reports. The portal 110A may provide one or more of the following capabilities/benefits:

Multi-contributional (i.e., allows multiple users to contribute and use the portal);
Searchable library of reusable assets (i.e., stored in the content repository 106B);
Search by sport, date ranges, year, owner/ingester, file format, event/file name, etc.;
Table of contents that presents a bird's eye view of related files (e.g., emulating a folder/subfolder structure);
File packaging (groups within groups/maintain file relationships without zipping);
File introspection;
Global program title data base access;
Push or pull file capabilities;
Glossary of terms, vendors register, and help tab;
Expunge assets via expiry/kill dates;
Preview video, graphics, and docs within DAM;
24/7 help desk to manage global scale;
Integrates with collaboration/communication/project management tools/online meetings; and
Attach discussion threads to assets.

Further abilities of the DAM system 200 may include file transcoding (i.e., the ability to download an asset in the file format of the user's choice), versioning and checkout, and preview file capability within the DAM system 200 with automatic proxy generation of all upload files.

Consequently, embodiments of the invention provide a unique application that is specific to sports marketing (and/ or television entertainment) that is accessible to marketing personnel throughout the world, and provide such personnel an opportunity, in real time, to interface with each other, and via a portal, pull up/download from a repository, either inspirational works or other works that can actually be used for broadcast purposes. As illustrated in the FIGs described above, users may search and find an asset directly via a portal 110A (e.g., FOX MEDIA CLOUD™ 112) into the content repository 106B. Alternatively, if dealing with a specific project (e.g., at a higher level), embodiments may filter/facilitate access to an asset by providing links that will transport the user directly to the assets within the content repository 106B or allow such assets to be previewed/ downloaded (see FIG. 5). Further, users can forward links and/or other info and request other users (e.g., vendors or other collaborators) to create/upload creative content/assets to a project.

In view of the above, when collaborating on a project/asset, users may contribute/upload content/assets from around the world, and others can then localize the uploaded content/assets and reuse/repurpose the content/assets (and/or upload the localized content for use by others). Further, the collaboration tool provides a means for providing consistency (e.g., across multiple business units) for a topic/asset of interest while also enabling a multi-user/group collaboration/negotiation. For example, multiple users/groups can collaborate together with respect to a single event (e.g., WORLD CUP™), and upon selecting a particular composer or special effects house, a coordinator/user can ask other users/groups to contribute a percentage of the overall cost for such a composer/special effects house. Consequently, embodiments of the invention provide an inspirational and creative repository that enables the uses of a consistent theme/level of quality/brand throughout a product/region/sport(s)/etc. In other words, an entire brand strategy may be overlaid onto a specific sporting event/television entertainment event/category/episodic to provide a consistent brand strategy over time and over location.

Logical Flow

Figure 6:
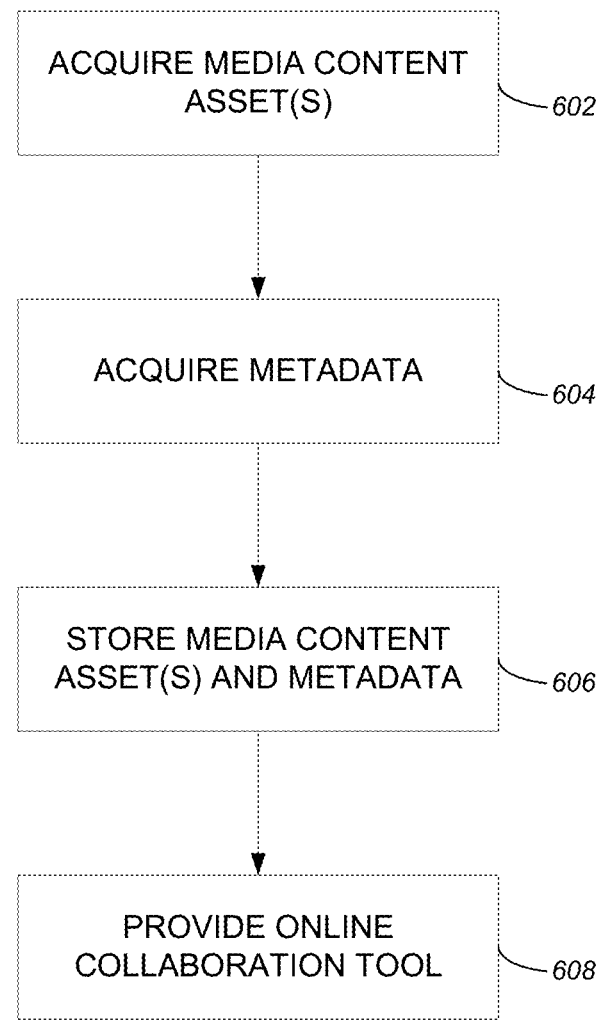
FIG. 6 illustrates the logical flow for managing a digital asset in accordance with one or more embodiments of the invention.

FIG. 6 illustrates the logical flow for managing a digital asset in accordance with one or more embodiments of the invention.

At step 602, one or more media content assets (e.g., sports related digital files) are acquired.

At step 604, metadata describing the one or more media content assets is acquired. Such metadata enables a search of the media content assets within a content repository. In one or more embodiments, the metadata provides a cost associated with the assets.

At step 606, the media content assets and metadata are stored in the content repository.

At step 608, an online collaboration tool is provided. The tool provides a discussion thread regarding the assets in the repository. The tool manages, controls, and provides preview, download, and upload capability, of the assets, to a defined set of user(s). Further, the tool provides search capability of the content repository for the assets based on the metadata. Also, the tool provides opt-in capability to allow users to opt-in to receive notifications regarding the assets (e.g., when a new asset is uploaded, an asset is changed/modified/deleted, etc.). Such opting-in users may be tracked and assets may be pushed to the opt-in users.

In addition, the tool provides a multi-contributional workspace where the user(s) that are authorized can preview, download, and upload the assets. Such a workspace may further comprise a project workspace that includes the discussion thread and links to download, preview, and edit the assets. In this regard, the project workspace provides an area for organizing/presenting multiple different assets and types of assets, and the ability for multiple authorized users to collaborate together regarding such assets. The online collaboration tool may also provide a link that activates a portal graphical user interface (GUI) into the content repository. Such a GUI may enable a direct download of the assets in the/from the repository.

With respect to the online collaboration tool, users may be located throughout the world, and a user in a particular geographic location may share a project such that the project is visible to a first set of the users based on a first set of permissions (e.g., all users, or the asset owner/owner's group [e.g., a group the asset owner is a member of such as a particular network subsidiary, e.g., SkyUK™]) and is available for download based on a second set of permissions (e.g., only to those users to which permission has been granted, and/or only to the asset owner or the asset owner's group).

In addition, the online collaboration tool may enable a user to identify a particular project or media content asset as a showcase element, wherein the showcase element does not expire and is available for download and viewing by the remaining users (e.g., for inspirational use and/or to provide a common theme/level of quality/grade desired).

Hardware Environment

Figure 7:
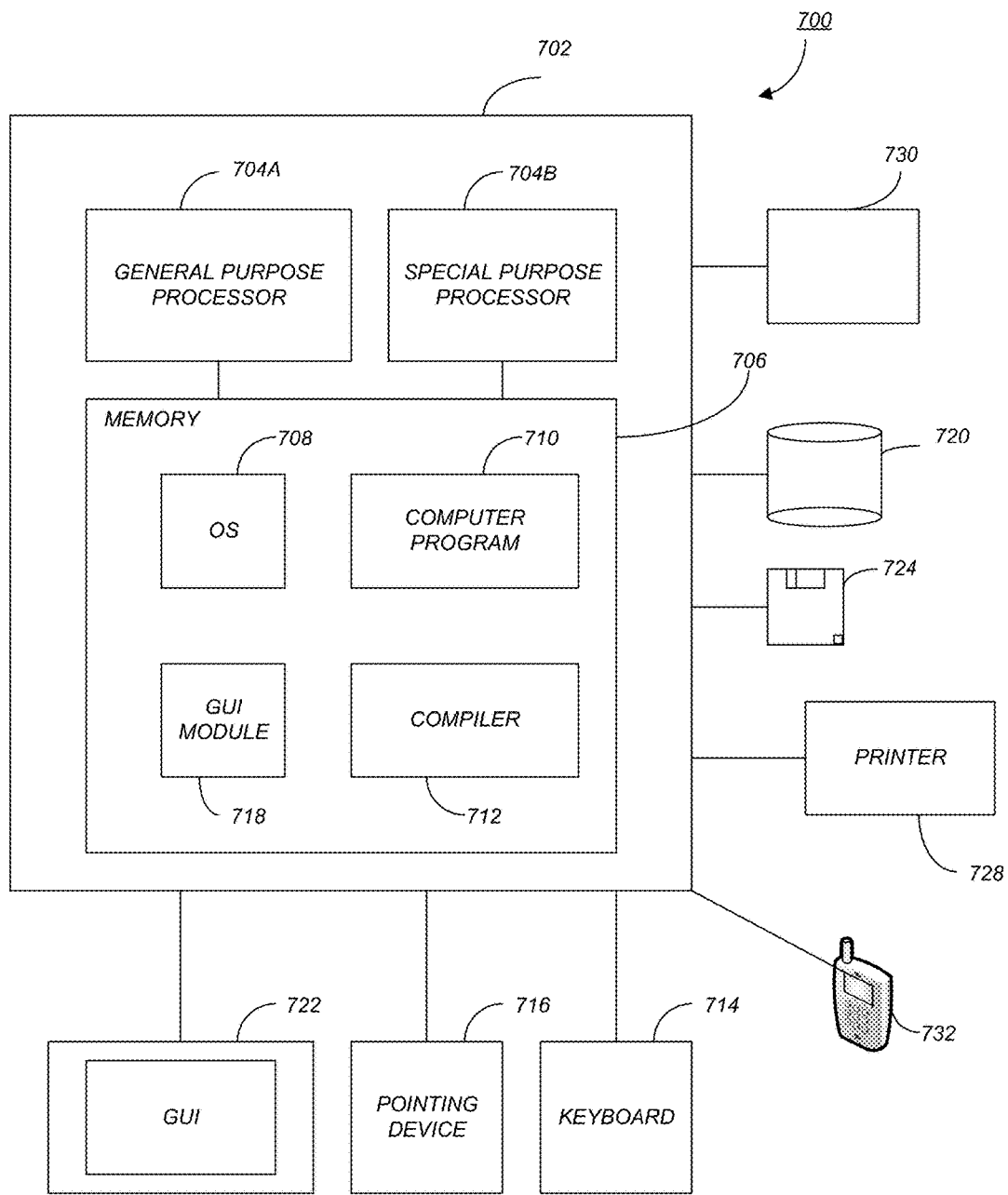
FIG. 7 is an exemplary hardware and software environment used to implement one or more embodiments of the invention.

FIG. 7 is an exemplary hardware and software environment 700 used to implement one or more embodiments of the invention. The hardware and software environment includes a computer 702 and may include peripherals. Computer 702 may be a user/client computer, server computer, or may be a database computer. The computer 702 comprises a general purpose hardware processor 704A and/or a special purpose hardware processor 704B (hereinafter alternatively collectively referred to as processor 704) and a memory 706, such as random access memory (RAM). The computer 702 may be coupled to, and/or integrated with, other devices, including input/output (I/O) devices such as a keyboard 714, a cursor control device 716 (e.g., a mouse, a pointing device, pen and tablet, touch screen, multi-touch device, etc.) and a printer 728. In one or more embodiments, computer 702 may be coupled to, or may comprise, a portable or media viewing/listening device 732 (e.g., an MP3 player, IPOD™, NOOK™, portable digital video player, cellular device, personal digital assistant, etc.). In yet another embodiment, the computer 702 may comprise a multi-touch device, mobile phone, gaming system, internet enabled television, television set top box, or other internet enabled device executing on various platforms and operating systems.

In one embodiment, the computer 702 operates by the general purpose processor 704A performing instructions defined by the computer program 710 under control of an operating system 708. The computer program 710 and/or the operating system 708 may be stored in the memory 706 and may interface with the user and/or other devices to accept input and commands and, based on such input and commands and the instructions defined by the computer program 710 and operating system 708, to provide output and results.

Output/results may be presented on the display 722 or provided to another device for presentation or further processing or action. In one embodiment, the display 722 comprises a liquid crystal display (LCD) having a plurality of separately addressable liquid crystals. Alternatively, the display 722 may comprise a light emitting diode (LED) display having clusters of red, green and blue diodes driven together to form full-color pixels. Each liquid crystal or pixel of the display 722 changes to an opaque or translucent state to form a part of the image on the display in response to the data or information generated by the processor 704 from the application of the instructions of the computer program 710 and/or operating system 708 to the input and commands. The image may be provided through a graphical user interface (GUI) module 718. Although the GUI module 718 is depicted as a separate module, the instructions performing the GUI functions can be resident or distributed in the operating system 708, the computer program 710, or implemented with special purpose memory and processors.

In one or more embodiments, the display 722 is integrated with/into the computer 702 and comprises a multi-touch device having a touch sensing surface (e.g., track pod or touch screen) with the ability to recognize the presence of two or more points of contact with the surface. Examples of multi-touch devices include mobile devices (e.g., IPHONE™, NEXUS S™, DROID™ devices, etc.), tablet computers (e.g., IPAD™, HP TOUCHPAD™), portable/handheld game/music/video player/console devices (e.g., IPOD TOUCH™, MP3 players, NINTENDO 3DS™, PLAYSTATION PORTABLE™, etc.), touch tables, and walls (e.g., where an image is projected through acrylic and/or glass, and the image is then backlit with LEDs).

Some or all of the operations performed by the computer 702 according to the computer program 710 instructions may be implemented in a special purpose processor 704B. In this embodiment, the some or all of the computer program 710 instructions may be implemented via firmware instructions stored in a read only memory (ROM), a programmable read only memory (PROM) or flash memory within the special purpose processor 704B or in memory 706. The special purpose processor 704B may also be hardwired through circuit design to perform some or all of the operations to implement the present invention. Further, the special purpose processor 704B may be a hybrid processor, which includes dedicated circuitry for performing a subset of functions, and other circuits for performing more general functions such as responding to computer program 710 instructions. In one embodiment, the special purpose processor 704B is an application specific integrated circuit (ASIC).

The computer 702 may also implement a compiler 712 that allows an application or computer program 710 written in a programming language such as COBOL, PASCAL, C++, FORTRAN, or other language to be translated into processor 704 readable code. Alternatively, the compiler 712 may be an interpreter that executes instructions/source code directly, translates source code into an intermediate representation that is executed, or that executes stored precompiled code. Such source code may be written in a variety of programming languages such as JAVA™, PERL™, BASIC™, etc. After completion, the application or computer program 710 accesses and manipulates data accepted from I/O devices and stored in the memory 706 of the computer 702 using the relationships and logic that were generated using the compiler 712.

The computer 702 also optionally comprises an external communication device such as a modem, satellite link, Ethernet card, or other device for accepting input from, and providing output to, other computers 702.

In one embodiment, instructions implementing the operating system 708, the computer program 710, and the compiler 712 are tangibly embodied in a non-transitory computer-readable medium, e.g., data storage device 720, which could include one or more fixed or removable data storage devices, such as a zip drive, floppy disc drive 724, hard drive, CD-ROM drive, tape drive, etc. Further, the operating system 708 and the computer program 710 are comprised of computer program 710 instructions which, when accessed, read and executed by the computer 702, cause the computer 702 to perform the steps necessary to implement and/or use the present invention or to load the program of instructions into a memory 706, thus creating a special purpose data structure causing the computer 702 to operate as a specially programmed computer executing the method steps described herein. Computer program 710 and/or operating instructions may also be tangibly embodied in memory 706 and/or data communications devices 730, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 702.

Figure 8:
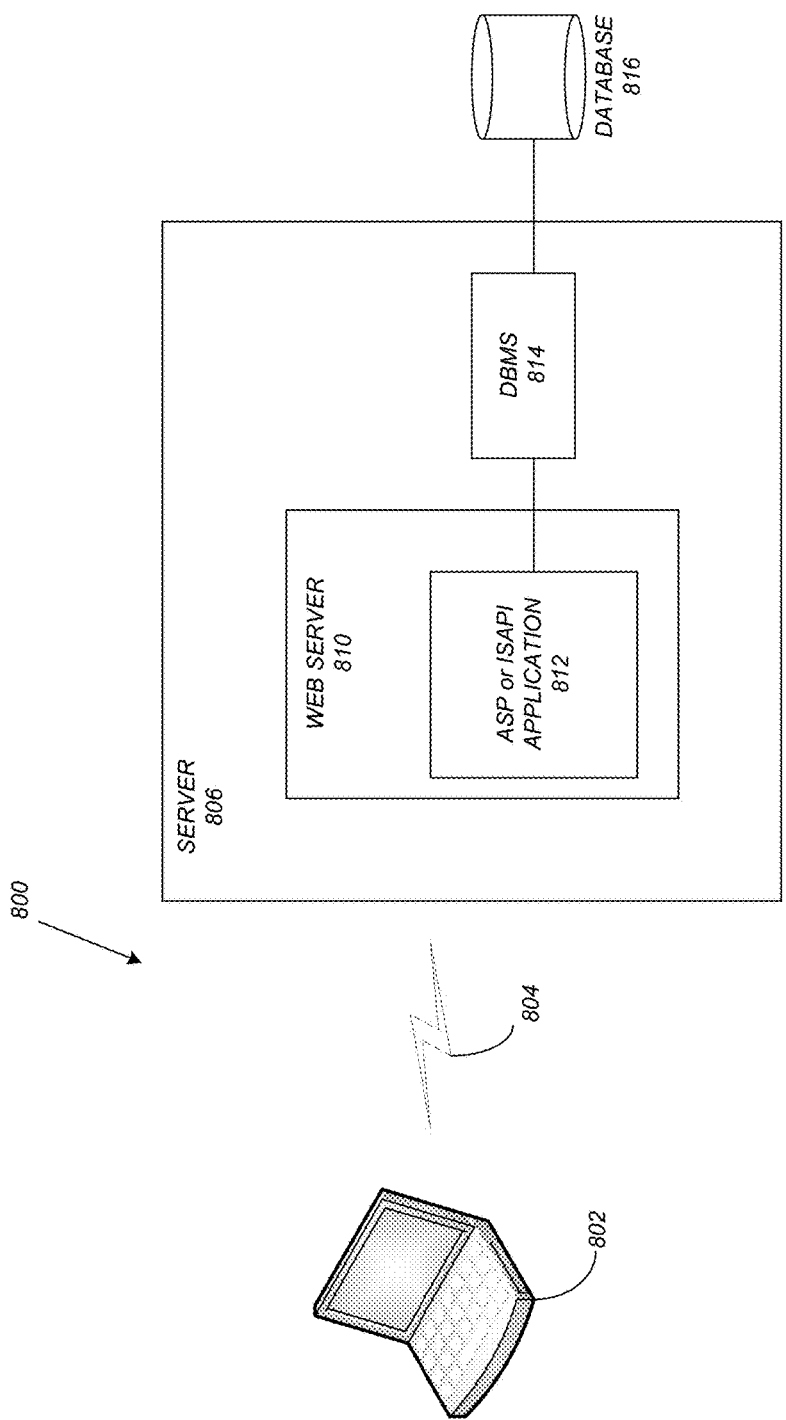
FIG. 8 schematically illustrates a typical distributed computer system using a network to connect client computers to server computers in accordance with one or more embodiments of the invention.

FIG. 8 schematically illustrates a typical distributed computer system 800 using a network 804 to connect client computers 802 to server computers 806. A typical combination of resources may include a network 804 comprising the Internet, LANs (local area networks), WANs (wide area networks), SNA (systems network architecture) networks, or the like, clients 802 that are personal computers or workstations (as set forth in FIG. 7), and servers 806 that are personal computers, workstations, minicomputers, or mainframes (as set forth in FIG. 7). However, it may be noted that different networks such as a cellular network (e.g., GSM [global system for mobile communications] or otherwise), a satellite based network, or any other type of network may be used to connect clients 802 and servers 806 in accordance with embodiments of the invention.

A network 804 such as the Internet connects clients 802 to server computers 806. Network 804 may utilize ethernet, coaxial cable, wireless communications, radio frequency (RF), etc. to connect and provide the communication between clients 802 and servers 806. Clients 802 may execute a client application or web browser and communicate with server computers 806 executing web servers 810. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 802 may be downloaded from server computer 806 to client computers 802 and installed as a plug-in or ACTIVEX™ control of a web browser. Accordingly, clients 802 may utilize ACTIVEX™ components/component object model (COM) or distributed COM (DCOM) components to provide a user interface on a display of client 802. The web server 810 is typically a program such as MICROSOFT'S INTERNET INFORMATION SERVER™.

Web server 810 may host an Active Server Page (ASP) or Internet Server Application Programming Interface (ISAPI) application 812, which may be executing scripts. The scripts invoke objects that execute business logic (referred to as business objects). The business objects then manipulate data in database 816 through a database management system (DBMS) 814. Alternatively, database 816 may be part of, or connected directly to, client 802 instead of communicating/obtaining the information from database 816 across network 804. When a developer encapsulates the business functionality into objects, the system may be referred to as a component object model (COM) system. Accordingly, the scripts executing on web server 810 (and/or application 812) invoke COM objects that implement the business logic. Further, server 806 may utilize MICROSOFT'S™ Transaction Server (MTS) to access required data stored in database 816 via an interface such as ADO (Active Data Objects), OLE DB (Object Linking and Embedding DataBase), or ODBC (Open DataBase Connectivity).

Generally, these components 800-816 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 802 and 806 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 802 and 806. Further, embodiments of the invention are implemented as a software application on a client 802 or server computer 806. In addition, as described above, the client 802 or server computer 806 may comprise a thin client device or a portable device that has a multi-touch-based display. As described above, the software application on client 802 or server computer 806 may include the DAM system 200, content repository 106B, collaboration tool 202, portal 110A, or any other elements set forth in FIGS. 1 and 2.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of managing a digital asset of a computer, comprising:
    acquiring one or more media content assets;
    acquiring metadata describing the one or more media content assets, wherein the metadata enables a search of the one or more media content assets within a content repository;
    storing the one or more media content assets and metadata in the content repository;
    providing an online collaboration tool on a user interface of the computer that causes the computer to:
        provide a discussion thread regarding the one or more media content assets in the content repository;
        manage, control, and provide preview, download, and upload capability, of the one or more media content assets, to a defined set of one or more users;
        provide search capability of the content repository for the one or more media content assets based on the metadata;
        provide opt-in capability to allow the one or more users to opt-in to receive notifications regarding the one or more media content assets;
        provide a multi-contributional workspace on the user interface wherein one or more of the one or more users, that have authorization, preview, download, and upload the one or more media content assets, to:
            set an order of display for the one or more media content assets;
            set an x-axis and y-axis position of the one or more media content assets; and
            annotate space surrounding the one or more media content assets with text or other markings; and
    enabling a creator of a first media content asset of the one or more media content assets to identify and designate the first media content asset as a showcase asset, wherein:
        the showcase asset does not expire;
        the showcase asset is used by the one or more users other than the creator;
        the showcase asset is downloaded and viewed by the one or more users other than the creator;
        the showcase asset is highlighted;
        the showcase asset includes an identification that provides a rationale regarding a purpose and intended use of the showcase asset; and
        the showcase asset identifies a level of quality for the one or more media content assets to enable a consistent brand strategy over time and over location.

2. The computer-implemented method of claim 1, wherein the multi-contributional workspace comprises a project workspace, wherein the project workspace comprises:
    the discussion thread;
    links to download, preview, and edit the one or more media content assets.

3. The computer-implemented method of claim 1, wherein the online collaboration tool comprises a link that activates a portal graphical user interface into the content repository, wherein the portal graphical user interface enables a direct download of the one or more media content assets.

4. The computer-implemented method of claim 1, wherein the one or more media content assets comprise sports related digital files.

5. The computer-implemented method of claim 1, further comprising:
    tracking the one or more users that opt-in; and
    pushing the one or more media content assets to the one or more users that have opted-in.

6. The computer-implemented method of claim 1, wherein the metadata provides a cost associated with the one or more media content assets.

7. The computer-implemented method of claim 1, wherein:
    the one or more users are located throughout the world;
    one of the one or more users that is located in a particular geographic location shares a project using the online collaboration tool, wherein the project is visible to a first set of the one or more users based on a first set of permissions, and the project is downloadable to a second set of one or more users based on a second set of permissions.

8. The computer-implemented method of claim 1, wherein the online collaboration tool is further configured to:
    providing the defined set of one or more users with an ability, from within the multi-contributional workspace, to:
        annotate one or more of the one or more media content assets; and provide a feedback mechanism for the defined set of one or more users to vote on a favorite asset.

9. The computer-implemented method of claim 1, wherein the showcase asset provides a common theme for the one or more media content assets.

10. A system for of managing a digital asset, comprising:
a computer;
a content repository executing on the computer;
one or more media content assets stored in the content repository;
metadata stored in the content repository, wherein the metadata:
describes the one or more media content assets; and
enables a search of the one or more media content assets within the content repository;
an online collaboration tool on a user interface of the computer that:
provides a discussion thread regarding the one or more media content assets in the content repository;
manages, controls, and provides preview, download, and upload capability, of the one or more media content assets, to a defined set of one or more users;
provides search capability of the content repository for the one or more media content assets based on the metadata;
provides opt-in capability to allow the one or more users to opt-in to receive notifications regarding the one or more media content assets;
provides a multi-contributional workspace on the user interface wherein one or more of the one or more users, that have authorization, preview, download, and upload the one or more media content assets, to:
set an order of display for the one or more media content assets;
set an x-axis and y-axis position of the one or more media content assets; and
annotate space surrounding the one or more media content assets with text or other markings; and
enables a creator of a first media content asset of the one or more media content assets to identify and designate the first media content asset as a showcase asset, wherein:
the showcase asset does not expire;
the showcase asset is used by the one or more users other than the creator;
the showcase asset downloaded and viewed by the one or more users other than the creator;
the showcase asset is available for download and viewing by the one or more users other than the creator;
the showcase asset is highlighted;
the showcase asset includes an identification that provides a rationale regarding a purpose and intended use of the showcase asset; and
the showcase asset identified a level of quality for the one or more media content assets to enable a consistent brand strategy over time and over location.

11. The system of claim 10, wherein the multi-contributional workspace comprises a project workspace, wherein the project workspace comprises:
the discussion thread;
links to download, preview, and edit the one or more media content assets.

12. The system of claim 10, wherein the online collaboration tool comprises a link that activates a portal graphical user interface into the content repository, wherein the portal graphical user interface enables a direct download of the one or more media content assets.

13. The system of claim 10, wherein the one or more media content assets comprise sports related digital files.

14. The system of claim 10, wherein the online collaboration tool:
tracks the one or more users that opt-in; and
pushes the one or more media content assets to the one or more users that have opted-in.

15. The system of claim 10, wherein the metadata provides a cost associated with the one or more media content assets.

16. The system of claim 10, wherein:
the one or more users are located throughout the world;
one of the one or more users that is located in a particular geographic location shares a project using the online collaboration tool, wherein the project is visible to a first set of the one or more users based on a first set of permissions, and the project is downloadable to a second set of one or more users based on a second set of permissions.

17. The system of claim 10, wherein the online collaboration tool:
provides the defined set of one or more users with an ability, from within the multi-contributional workspace, to:
annotate one or more of the one or more media content assets; and
provide a feedback mechanism for the defined set of one or more users to vote on a favorite asset.

18. The system of claim 10, wherein the showcase asset provides a common theme for the one or more media content assets.

* * * * *